(12) United States Patent
Morris et al.

(10) Patent No.: US 11,478,983 B2
(45) Date of Patent: Oct. 25, 2022

(54) ADDITIVE MANUFACTURING APPARATUS AND METHOD FOR LARGE COMPONENTS

(71) Applicant: General Electric Company, Schenectady, NY (US)

(72) Inventors: Gregory Muster Morris, Cincinnati, OH (US); Guenter Helmut Wilfert, Garching b. Munich (DE); Todd Jay Rockstroh, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 429 days.

(21) Appl. No.: 16/565,941

(22) Filed: Sep. 10, 2019

(65) Prior Publication Data
US 2021/0069967 A1 Mar. 11, 2021

Related U.S. Application Data

(62) Division of application No. 14/744,982, filed on Jun. 19, 2015, now Pat. No. 10,449,606.

(51) Int. Cl.
| | | |
|---|---|---|
| B29C 64/153 | (2017.01) | |
| B29C 64/245 | (2017.01) | |
| B29C 64/241 | (2017.01) | |
| B29C 64/255 | (2017.01) | |
| B29C 64/264 | (2017.01) | |

(Continued)

(52) U.S. Cl.
CPC .......... *B29C 64/153* (2017.08); *B29C 64/205* (2017.08); *B29C 64/241* (2017.08); *B29C 64/245* (2017.08); *B29C 64/255* (2017.08);

*B29C 64/264* (2017.08); *B29C 64/329* (2017.08); *B29C 64/343* (2017.08);
(Continued)

(58) Field of Classification Search
CPC .... B29C 64/153; B29C 64/264; B29C 64/245
See application file for complete search history.

(56) References Cited

U.S. PATENT DOCUMENTS

| | | |
|---|---|---|
| 3,931,949 A | 1/1976 | Waligorski et al. |
| 4,863,538 A | 9/1989 | Deckard |

(Continued)

FOREIGN PATENT DOCUMENTS

| | | |
|---|---|---|
| CN | 1426335 A | 6/2003 |
| CN | 101580929 A | 11/2009 |

(Continued)

OTHER PUBLICATIONS

First Chinese Office Action Corresponding to CN2016104409327 dated Dec. 27, 2017.

(Continued)

*Primary Examiner* — Alison L Hindenlang
*Assistant Examiner* — Olukorede Esan
(74) *Attorney, Agent, or Firm* — Dinsmore & Shohl LLP

(57) ABSTRACT

An additive manufacturing apparatus includes: first and second spaced apart side walls extending along a pre-defined path and defining a build chamber therebetween; one or more build units mounted for movement along the pre-defined path, the one or more build units including at least one of: a powder dispenser positioned above the build chamber; an applicator configured to scrape powder dispensed into the build chamber; and a directed energy source configured to fuse the scraped powder.

17 Claims, 7 Drawing Sheets

(51) Int. Cl.
*B29C 64/343* (2017.01)
*B29C 64/329* (2017.01)
*B29C 64/35* (2017.01)
*B29C 64/205* (2017.01)
*B33Y 40/00* (2020.01)
*B33Y 10/00* (2015.01)
*B33Y 30/00* (2015.01)

(52) U.S. Cl.
CPC .............. *B29C 64/35* (2017.08); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 5,094,935 A | 3/1992 | Vassiliou et al. | |
| 5,135,695 A | 8/1992 | Marcus | |
| 5,354,414 A | 10/1994 | Feygin | |
| 5,730,925 A | 3/1998 | Mattes et al. | |
| 5,908,569 A | 6/1999 | Wilkening et al. | |
| 5,980,812 A | 11/1999 | Lawton | |
| 6,340,150 B1 | 1/2002 | Sato et al. | |
| 6,554,600 B1 | 4/2003 | Hofmann et al. | |
| 6,940,037 B1 | 9/2005 | Kovacevic et al. | |
| 7,389,154 B2 | 6/2008 | Hunter et al. | |
| 7,748,971 B2 | 7/2010 | Hochsmann et al. | |
| 7,846,375 B2 | 12/2010 | Gohill et al. | |
| 8,021,138 B2 | 9/2011 | Green | |
| 8,430,226 B2 | 4/2013 | Tokunaga et al. | |
| 8,658,078 B2 | 2/2014 | Weidinger et al. | |
| 9,333,709 B2 | 5/2016 | Hartmann | |
| 9,711,723 B2 | 7/2017 | Ando et al. | |
| 9,744,723 B2 | 8/2017 | Baumann et al. | |
| 2002/0195746 A1 | 12/2002 | Hull et al. | |
| 2003/0083771 A1 | 5/2003 | Schmidt | |
| 2004/0056378 A1 | 3/2004 | Bredt et al. | |
| 2004/0104515 A1 | 6/2004 | Swanson et al. | |
| 2006/0108712 A1* | 5/2006 | Mattes .................. | B33Y 30/00 264/308 |
| 2007/0026099 A1 | 2/2007 | Hagiwara | |
| 2007/0298182 A1 | 12/2007 | Perret et al. | |
| 2008/0083715 A1 | 4/2008 | Kirmeier | |
| 2008/0131104 A1 | 6/2008 | Philippi | |
| 2009/0169664 A1 | 7/2009 | Cox | |
| 2009/0206522 A1* | 8/2009 | Hein .................... | B29C 64/153 264/497 |
| 2009/0236068 A1 | 9/2009 | Ondrovic et al. | |
| 2009/0295039 A1 | 12/2009 | Fruth et al. | |
| 2010/0007062 A1 | 1/2010 | Larsson et al. | |
| 2010/0224604 A1 | 9/2010 | Budde et al. | |
| 2010/0283188 A1 | 11/2010 | Rohner et al. | |
| 2011/0135833 A1 | 6/2011 | Schmitz et al. | |
| 2011/0168091 A1 | 7/2011 | Baumann et al. | |
| 2012/0308781 A1 | 12/2012 | Abe et al. | |
| 2013/0004680 A1 | 1/2013 | Godfrey et al. | |
| 2013/0034633 A1 | 2/2013 | von Hassein | |
| 2014/0069893 A1 | 3/2014 | Bruck et al. | |
| 2014/0140882 A1 | 5/2014 | Syassen | |
| 2014/0144895 A1 | 5/2014 | Stork Genannt Wersborg et al. | |
| 2014/0151349 A1 | 6/2014 | Ma | |
| 2014/0191439 A1 | 7/2014 | Davis | |
| 2014/0263209 A1 | 9/2014 | Burris et al. | |
| 2014/0308153 A1 | 10/2014 | Ljungblad | |
| 2014/0314609 A1 | 10/2014 | Ljungblad et al. | |
| 2014/0332507 A1 | 11/2014 | Fockele | |
| 2014/0348691 A1 | 11/2014 | Ljungblad et al. | |
| 2014/0363585 A1 | 12/2014 | Pialot et al. | |
| 2014/0370323 A1 | 12/2014 | Ackelid | |
| 2015/0004045 A1 | 1/2015 | Ljungblad | |
| 2015/0017013 A1 | 1/2015 | Tozzi et al. | |
| 2015/0017054 A1 | 1/2015 | Jakimov et al. | |
| 2015/0017055 A1 | 1/2015 | Abe et al. | |
| 2015/0017271 A1 | 1/2015 | Donaldson et al. | |
| 2015/0048058 A1 | 2/2015 | Bruck et al. | |
| 2015/0050463 A1 | 2/2015 | Nakano et al. | |
| 2015/0060422 A1 | 3/2015 | Liebl et al. | |
| 2015/0069668 A1 | 3/2015 | Mironets et al. | |
| 2015/0071809 A1 | 3/2015 | Nordkvist et al. | |
| 2015/0083692 A1 | 3/2015 | Bruck | |
| 2015/0086409 A1 | 3/2015 | Hellestam | |
| 2015/0132173 A1 | 5/2015 | Bruck et al. | |
| 2015/0165525 A1 | 6/2015 | Jonasson | |
| 2015/0174658 A1 | 6/2015 | Ljungblad | |
| 2015/0174695 A1 | 6/2015 | Elfstroem et al. | |
| 2015/0251249 A1 | 9/2015 | Fager | |
| 2015/0275687 A1 | 10/2015 | Bruck et al. | |
| 2015/0283610 A1 | 10/2015 | Ljungblad et al. | |
| 2015/0283613 A1 | 10/2015 | Backlund et al. | |
| 2015/0290741 A1 | 10/2015 | Abe et al. | |
| 2015/0306699 A1 | 10/2015 | Honda | |
| 2015/0314389 A1 | 11/2015 | Yamada | |
| 2015/0314403 A1 | 11/2015 | Bruck et al. | |
| 2015/0321255 A1 | 11/2015 | Colin et al. | |
| 2015/0321420 A1 | 11/2015 | Karpas et al. | |
| 2015/0352787 A1 | 12/2015 | Humbert et al. | |
| 2015/0367446 A1 | 12/2015 | Buller et al. | |
| 2016/0001509 A1 | 1/2016 | Long | |
| 2016/0046077 A1 | 2/2016 | Yadroitsau | |
| 2016/0052056 A1 | 2/2016 | Fager | |
| 2016/0052079 A1 | 2/2016 | Ackelid | |
| 2016/0059314 A1 | 3/2016 | Ljungblad et al. | |
| 2016/0059315 A1 | 3/2016 | Baudimont | |
| 2016/0067779 A1 | 3/2016 | Dautova et al. | |
| 2016/0067820 A1 | 3/2016 | Mironets et al. | |
| 2016/0074938 A1 | 3/2016 | Kitani et al. | |
| 2016/0084089 A1 | 3/2016 | Blaney et al. | |
| 2016/0121430 A1 | 5/2016 | Deiss et al. | |
| 2016/0129501 A1 | 5/2016 | Loewgren et al. | |
| 2016/0167303 A1* | 6/2016 | Petelet ................ | B23K 15/02 264/497 |
| 2016/0175929 A1 | 6/2016 | Colin et al. | |
| 2016/0193696 A1 | 7/2016 | McFarland et al. | |
| 2017/0203517 A1 | 7/2017 | Crear et al. | |
| 2017/0210073 A1 | 7/2017 | Frontera et al. | |
| 2017/0239721 A1 | 8/2017 | Buller et al. | |
| 2017/0242424 A1 | 8/2017 | Spears | |

FOREIGN PATENT DOCUMENTS

| | | |
|---|---|---|
| JP | 2003/001715 A | 1/2003 |
| JP | 2005/059477 A | 3/2005 |

OTHER PUBLICATIONS

European Search Report Corresponding to EP161742424 dated Nov. 4, 2016.
Notification of Reasons for Refusal Corresponding to JP2016/113969 dated Aug. 29, 2017.

* cited by examiner

ADDITIVE MANUFACTURING APPARATUS AND METHOD FOR LARGE COMPONENTS

CROSS REFERENCE TO RELATED APPLICATIONS

This application claims priority to, and is a divisional application of, U.S. patent application Ser. No. 14/744,982 filed Jun. 19, 2015 which is incorporated by reference in its entirety herein.

BACKGROUND OF THE INVENTION

This invention relates generally to an additive manufacturing apparatus and more particularly to an apparatus for large components.

"Additive manufacturing" is a term used herein to describe a process which involves layer-by-layer construction or additive fabrication (as opposed to material removal as with conventional machining processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Sterolithography (SLA), Electron Beam Melting (EBM), Laser Engineered Net Shaping (LENS), and Direct Metal Deposition (DMD).

Currently, powder bed technologies have demonstrated the best resolution capabilities of prior art metal additive manufacturing technologies. However, since the build needs to take place in the powder bed, conventional machines use a large amount of powder, for example a powder load can be over 130 kg (300 lbs.). This is costly when considering a factory environment using many machines. The powder that is not directly melted into the part but stored in the neighboring powder bed is problematic because it adds weight to the elevator systems, complicates seals and chamber pressure problems, is detrimental to part retrieval at the end of the part build, and becomes unmanageable in large bed systems currently being considered for large components.

Accordingly, there remains a need for an additive manufacturing apparatus and method that can produce large parts.

BRIEF SUMMARY OF THE INVENTION

This need is addressed by the present invention, which provides apparatus and method for manufacturing parts by using one or more build units movable along a path over a build chamber.

According to one aspect of the invention, an additive manufacturing apparatus includes first and second spaced apart side walls extending along a pre-defined path and defining a build chamber therebetween one or more build units mounted for movement along the pre-defined path, the one or more build units collectively including a powder dispenser positioned above the build chamber an applicator configured to scrape powder dispensed into the build chamber; and a directed energy source configured to fuse the scraped powder.

According to another aspect of the invention, an additive manufacturing method includes: positioning one or more build units over a build chamber defined by first and second spaced-apart side walls which extend along a pre-defined path; moving the one or more build units relative to the build chamber along the pre-defined path; using the one or more build units to deposit powder onto a build platform contained in the build chamber and form a layer increment of powder thereon; using the one or more build units to direct a beam from a directed energy source to fuse the powder; moving at least one of the build platform, first and second spaced-apart walls, and one or more build units by the layer increment; and repeating in a cycle the steps of depositing, directing, and moving to build up a part in a layer-by-layer fashion until the part is complete.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
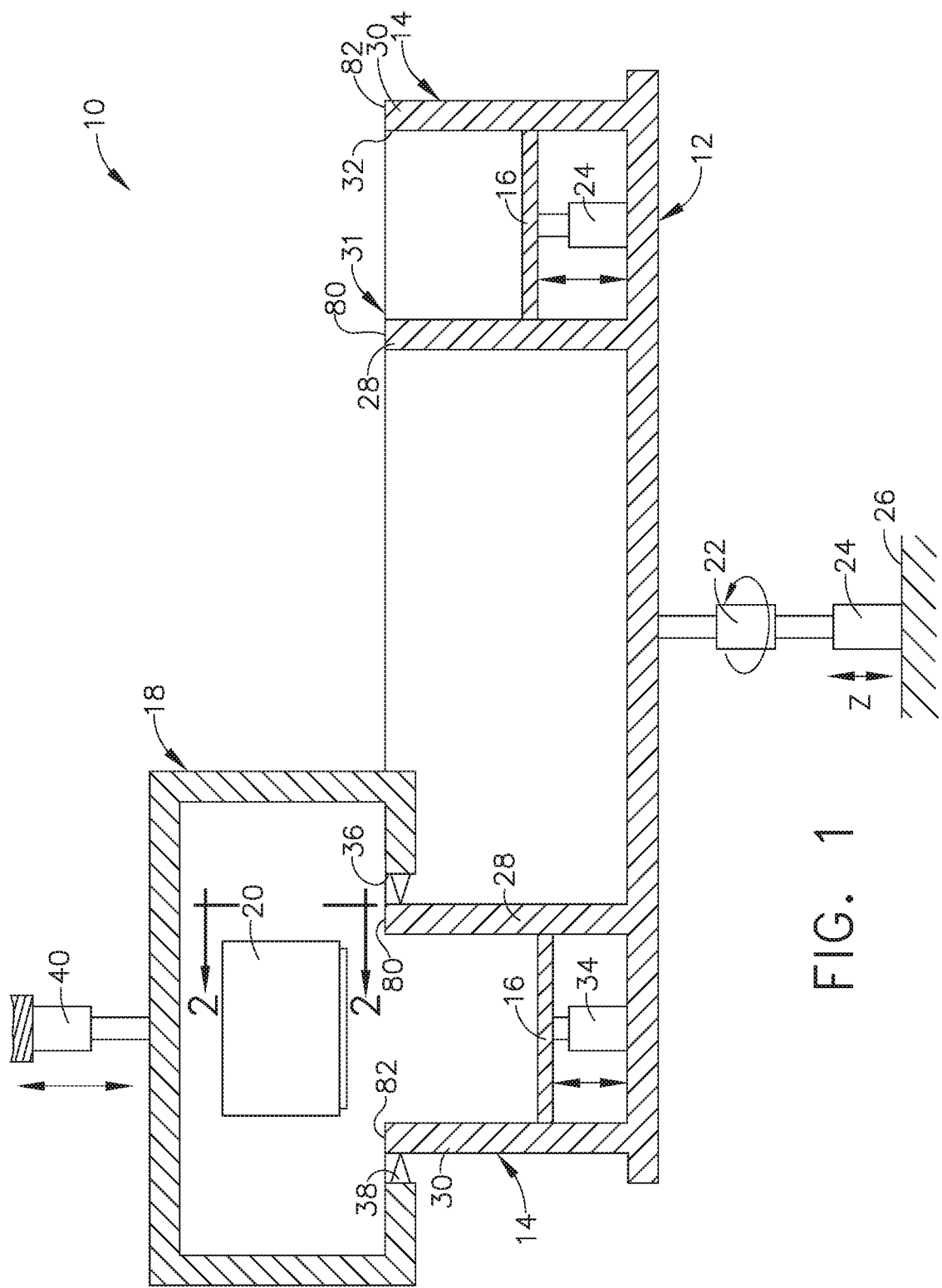
FIG. 1 is a cross-sectional view of an additive manufacturing apparatus constructed according to an aspect of the present invention.
Figure 2:
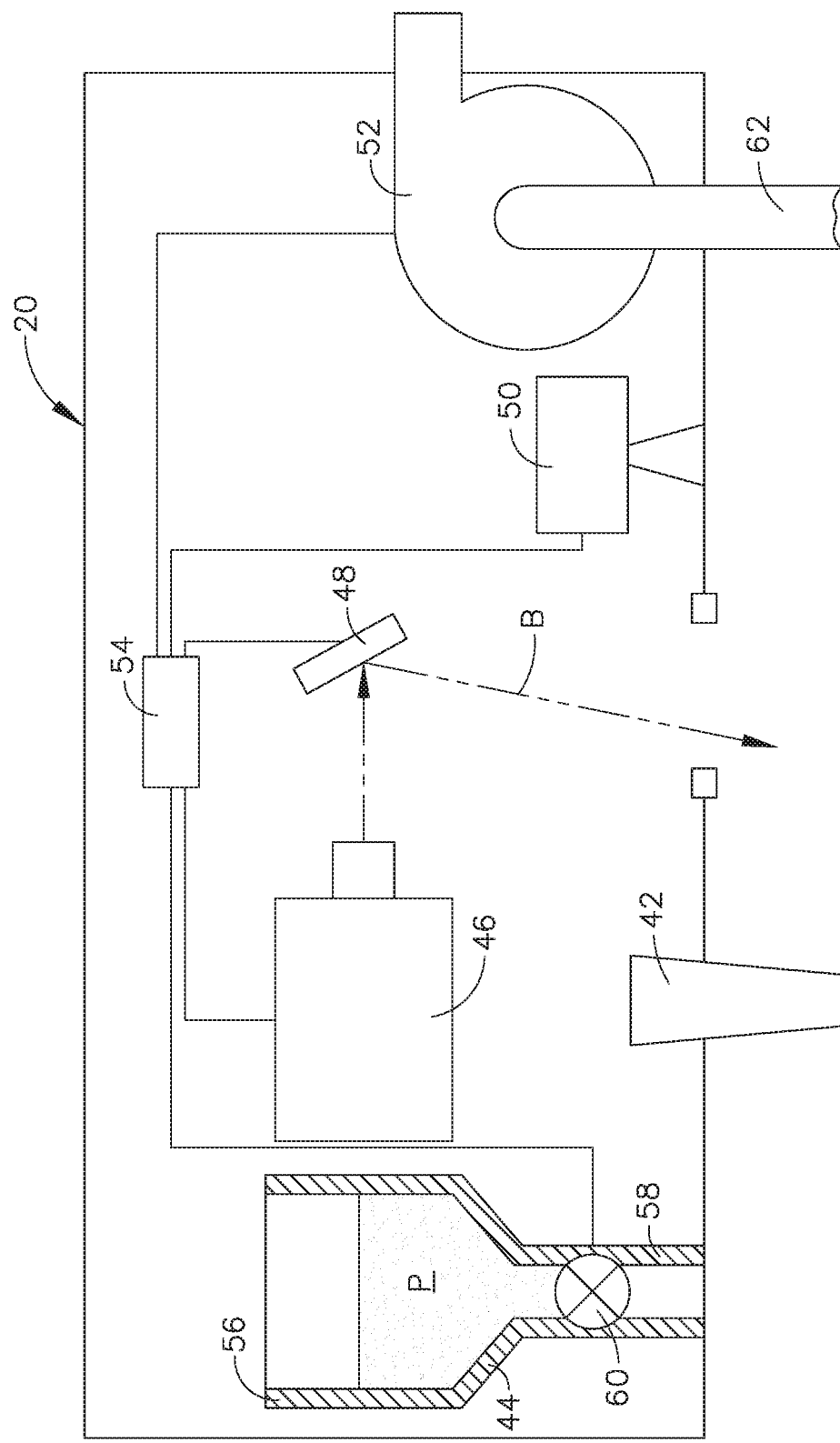
FIG. 2 is a schematic sectional view of a fusing unit of FIG. 1.

Referring to the drawings wherein identical reference numerals denote the same elements throughout the various views, FIGS. 1 and 2 illustrate an exemplary additive manufacturing apparatus 10 constructed according to the technology described herein. The basic components are a turntable 12, a build chamber 14 surrounding a build platform 16, a housing 18, and a fusing unit 20 disposed in the housing 18. Each of these components will be described in more detail below.

The turntable 12 is a rigid structure configured to move vertically (i.e. parallel to a z-axis) as well as rotate 360°. As illustrated, the turntable 12 is secured to an end mount of a motor 22 that is operable to selectively rotate the turntable 12 and the motor 22 is secured to an end mount of an actuator 24 that is operable to selectively move the turntable 12 vertically up or down. The actuator 24 is secured to a stationary support structure 26. The actuator 24 is depicted schematically in FIG. 1. Whenever the term "actuator" herein, it will be understood that devices such as pneumatic or hydraulic cylinders, ballscrew or linear actuators, and so forth, may be used for this purpose. The motor 22 is depicted schematically in FIG. 1, with the understanding that any device that will produce controlled rotary motion may be used for this purpose.

Figure 3:
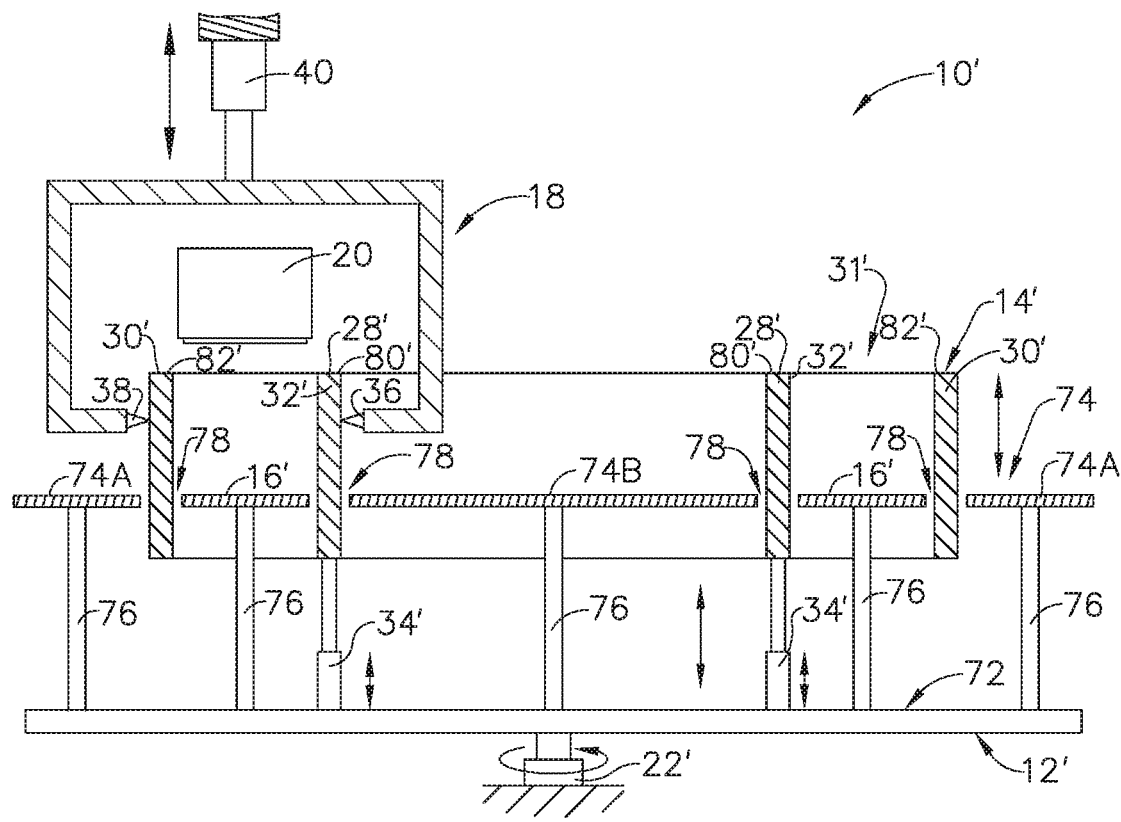
FIG. 3 is a cross-sectional view of an alternative additive manufacturing apparatus constructed according to an aspect of the present invention.
Figure 5:
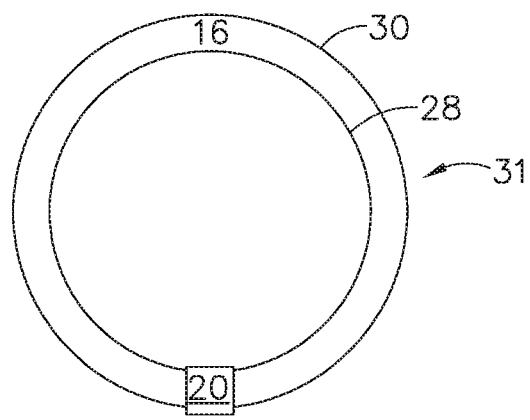
FIG. 5 is a schematic top plan view of the apparatus of FIG. 1.
Figure 6:
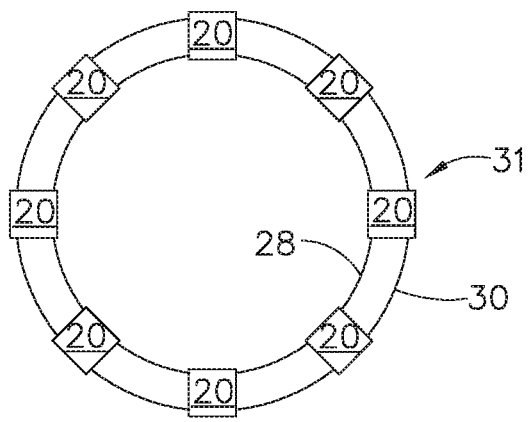
FIG. 6 is a top plan view of an alternative arrangement of the apparatus of FIG. 1.

The build chamber 14 includes inner and outer side walls 28 and 30 that define a build chamber opening 32. As illustrated, the inner and outer side walls 28 and 30 extend perpendicularly upward from the turntable 12 to define a path in the form of a ring 31, see FIG. 5, to allow continuous manufacturing and may be integrally formed with the turntable 12. Alternatively, as shown in FIG. 3, the ring may be separated from the turntable. It should be appreciated that the inner and outer side walls 28 and 30 may extend upwardly from the turntable 12 at angles other than ninety degrees. As depicted in FIGS. 5 and 6, the inner and outer side walls 28 and 30 define a path in the form of ring 31; however, it should be appreciated that the inner and outer side walls 28 and 30 may define paths in other forms such as straight lines, curves and or polygons to permit the manufacture of various shaped parts.

The build platform 16 is a plate-like structure that is vertically slidable in the build chamber 14 below build chamber opening 32. The build platform 16 extends an entire length of the build chamber 14 and is secured to an end mount of one or more actuators 34 that are operable to selectively move the build platform 16 up or down as the turntable 12 rotates. The actuators 34 are depicted schematically in FIG. 1.

The housing 18 includes an opening 36 configured to receive at least a portion of the build chamber 14 therein and to permit the fusing unit 20 to build a part. A seal 38 is disposed around the opening 36 to provide sealing engagement between the opening 36 and the inner and outer side walls 28 and 30 of the build chamber 14. The seal 38 prevents contaminants from interfering with the build process, centers the housing 18 with the build chamber 14, and permits the housing 18 to slide along the inner and outer side walls 28 and 30 as the turntable 12 rotates with minimal interference. The housing 18 is secured to an end mount of an actuator 40 that is operable to selectively move the housing 18 up or down during a build process to maintain a pre-determined distance between the fusing unit 20 and a part being built. The actuator 40 also allows the housing to be removed from engagement with the inner and outer side walls 28 and 30. The actuator 40 is depicted schematically in FIG. 1.

As illustrated in FIG. 2, the fusing unit 20, includes an applicator 42, a powder dispenser 44, a directed energy source 46, a beam steering apparatus 48, an imaging device 50, a vacuum pump 52, and a controller 54. The fusing unit 20 is one example of a "build unit" which refers generally to any unit positioned over the build chamber 14 and configured to perform one or more steps of an additive build process. Other types of build units are described below.

Figure 7:
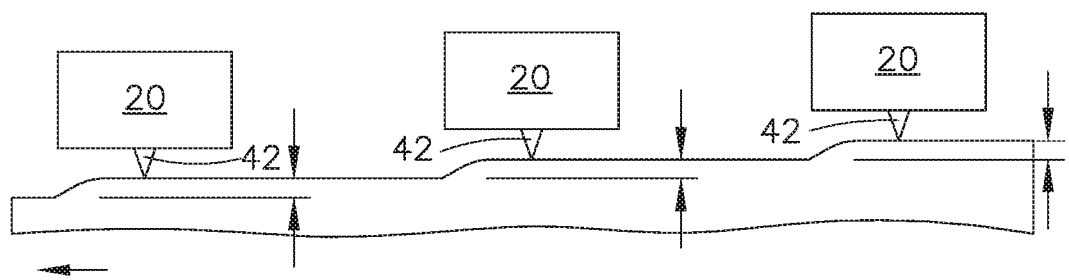
FIG. 7 is a schematic side view of the operation of the apparatus of FIG. 6.
Figure 8:
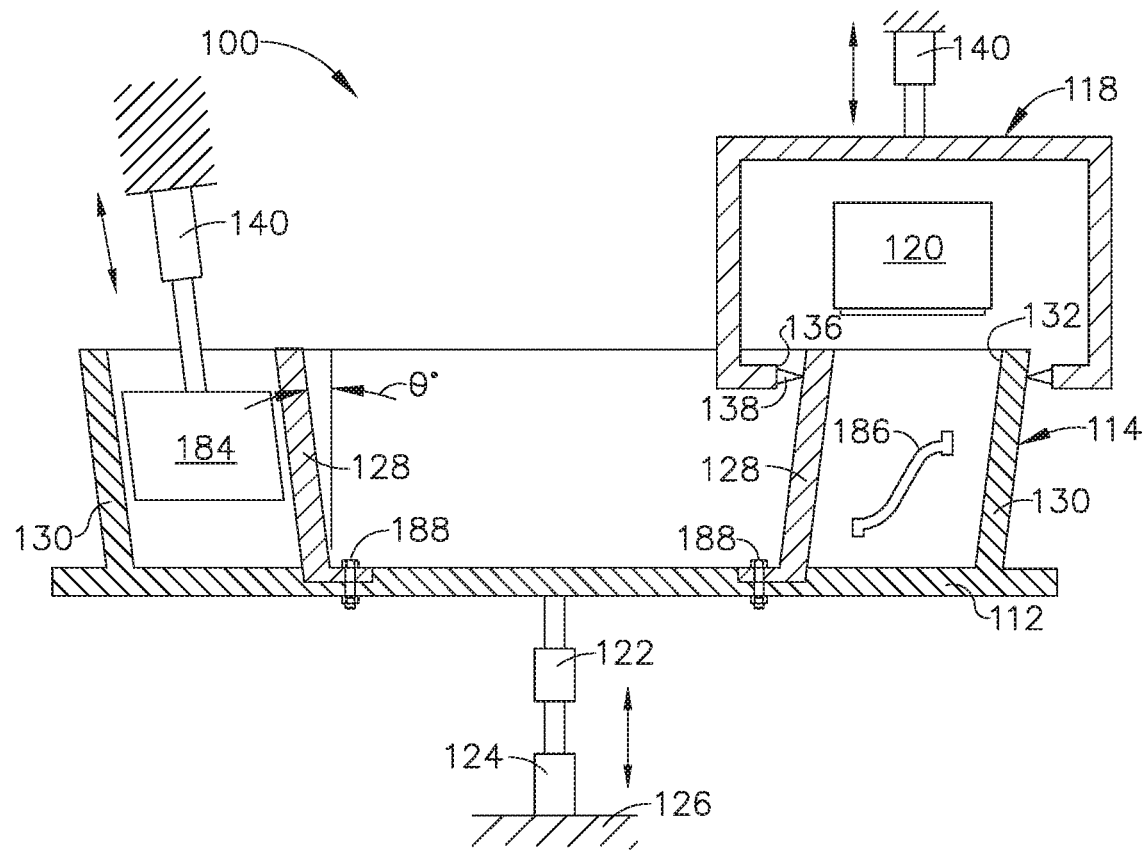
FIG. 8 is a cross-sectional view of another alternative additive manufacturing apparatus constructed according to an aspect of the present invention.

The applicator 42 is a rigid, laterally-elongated structure that, when used, scrapes along at a fixed distance above the build platform 16 to provide a layer increment of powder thereon between inner and outer side walls 28 and 30, see FIG. 7.

The powder dispenser 44 comprises a supply container 56 in the form of a hopper having a spout 58 for dropping powder P onto the build platform 16. A metering valve 60 is positioned in the spout 58. In use, the metering valve 60 is used to control the deposition rate of powder P based on multiple factors such as the size of the build platform 16, a desire layer increment thickness, and the relative speed between the build platform 16 and the fusing unit 20.

The directed energy source 46 may comprise any known device operable to generate a beam of suitable power and other operating characteristics to melt and fuse the powder during the build process, described in more detail below. For example, the directed energy source 46 may be a laser. Other directed-energy sources such as electron beam guns are suitable alternatives to a laser.

The beam steering apparatus 48 comprises one or more mirrors, prisms, and/or lenses and provided with suitable actuators, and arranged so that a beam "B" from the directed energy source 46 can be focused to a desired spot size and steered to a desired position in an X-Y plane coincident with the build platform 16.

The vacuum pump 52 includes a nozzle 62 configured to extend into the build chamber 14. The vacuum pump 52 may be used to remove excess powder after the applicator 42 has leveled powder and before fusing takes place.

The imaging device 50 may be any apparatus that provides a signal or data indicative of the surface condition within the build chamber 14, such as camera or other sensor operating in the visible, IR, and/or UV spectrum. The imaging device 50 allows a user to monitor the build process and modify the operating parameters of the fusing unit 20 and/or shut the build process down when the user detects a defect or malfunction in the build process. The imaging device 50 may also be connected to the controller 54 to provide an automated quality control process. The controller 54 controls the directed energy source 46, the beam steering apparatus 48, the powder dispenser 44, and the vacuum pump 52 of the fusing unit 20. The imaging device 50 provides the controller 54 with signals representative of the condition of the build process. For example, the controller 54 may use data from the imaging device 50 to control powder flow rate and/or to stop the build process upon detection of a defect.

Figure 4:
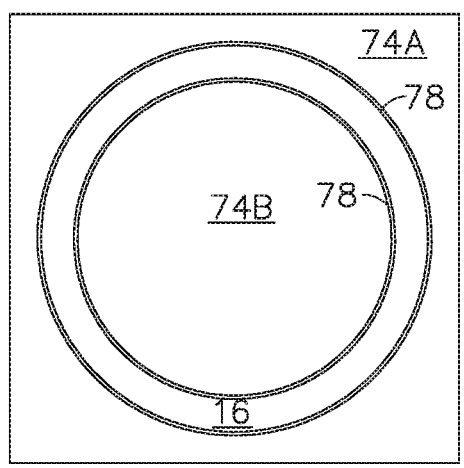
FIG. 4 is a top plan view of the apparatus of FIG. 3.

FIGS. 3 and 4 illustrate another configuration of additive manufacturing apparatus 10 and is shown at reference numeral 10'. Like apparatus 10, apparatus 10' uses the housing 18 and fusing unit 20 described above. It should also be appreciated that the apparatus 10' may use separate laser and powder units like that described below with reference to additive manufacturing apparatus 100. Like apparatus 10, apparatus 10' includes a turntable 12' and a build chamber 14' surrounding a build platform 16'. Each of these components will be described in more detail below.

The turntable 12' is a rigid structure configured to rotate 360°. As illustrated, the turntable 12' is secured to an end mount of a motor 22' that is operable to selectively rotate the turntable 12'. The motor 22' is depicted schematically in FIG. 3.

The turntable 12' includes spaced-apart lower and upper platforms 72 and 74. The upper platform 74 is supported by struts 76 extending between the lower and upper platforms 72 and 74 and is divided into plate-like sections 74A, 74B, and build platform 16' by slots 78 extending therethrough. It should be appreciated that the upper platform 74 may be formed of only the build platform 16'. As illustrated, each plate-like section 74A, 74B, and build platform 16' are individually supported by struts 76. It should be appreciated that while the struts 76 are illustrated as a fixed length strut, an actuator may be used in place of the fixed length strut to permit vertical movement of the upper platform sections.

The build chamber 14' includes inner and outer side walls 28' and 30' that define a build chamber opening 32'. As illustrated, the inner and outer side walls 28' and 30' extend upwardly relative to the turntable 12' and are parallel to each other to form a ring 31' to allow continuous manufacturing.

As illustrated, the inner and outer side walls 28' and 30' extend perpendicular to the turntable 12', it should be appreciated that the inner and outer side walls 28' and 30' may extend upwardly at angles other than ninety degrees. As depicted in FIG. 4, the inner and outer side walls 28' and 30' define a path in the form of ring 31'; however, it should be appreciated that the inner and outer side walls 28' and 30' may define paths in other forms such as straight lines, curves, or polygons to permit the manufacture of various shaped parts.

The ring 31' is connected to end mounts of actuators 34' for vertical up or down movement relative to the lower platform 72 of the turntable 12'. The inner and outer walls 28' and 30' of the ring 31' are positioned in respective slots 78 to allow the ring 31' to move vertically between upper platform sections 74A, 74B, and build platform 16'. As illustrated, the ring 31' surrounds build platform 16' to form the build chamber 14'. The actuator 34' is depicted schematically in FIG. 1.

As discussed above, the build platform 16' is bounded by slots 78 extending through the upper platform 74. The build platform 16' is a plate-like structure that is fixedly secured to the lower platform 72 by struts 76. The build platform 16' extends into the build chamber 14' below the build chamber opening 32' and extends an entire length of the build chamber 14'. In addition to build platform 16', upper platform sections 74A and 74B provide additional centering support to the ring 31' while the turntable 12' is rotating and moving up or down.

For purposes of clarity, the primary build process will be described using additive manufacturing apparatus 10. Differences between additive manufacturing apparatuses 10 and 10' will be delineated, where appropriate, throughout the build process description.

The build process for a part using the additive manufacturing apparatus 10 described above is as follows. The fusing unit 20 is prepared by filling the powder supply 44 with powder P. The fusing unit 20 is positioned such that seal 38 of housing 18 engages the inner and outer side walls 28 and 30. It should be appreciated that positioning the fusing unit 20 may be accomplished by using actuator 40 to lower the fusing unit 20 and/or by using actuator 24 to raise the turntable 12. In regards to additive manufacturing unit 10', the ring 31' may be raised using actuators 34' instead of raising turntable 12'.

Once the fusing unit 20 is positioned, the build platform 16 is moved to an initial high position by actuator 34. For additive manufacturing apparatus 10', the ring 31' is lowered until the build platform 16' is at the initial high position. Housing 18 and fusing unit 20 would also be lowered to maintain engagement between seal 38 and inner and outer side walls 28' and 30'. The initial high position is located below upper surfaces 80 and 82 of the inner and outer side walls 28 and 30, respectively and which define the build chamber opening 32, by a selected layer increment. The layer increment affects the speed of the additive manufacturing process and the resolution of the part. As an example, the layer increment may be about 10 to 50 micrometers (0.0004 to 0.002 in.). The turntable 12 is then rotated by motor 22 at a pre-determined rotational speed selected to permit the fusing unit 20 to melt or fuse powder being dropped onto the build platform 16 to form a part, see FIG. 5. It should be appreciated that more than one housing 18 and fusing unit 20 may be used. As illustrated in FIG. 6, fusing units 20 may be dispersed around the ring 31 to speed up and provide a more efficient build process. It should also be appreciated that the fusing unit may be moved along the inner and outer side walls 28 and 30 instead of rotating the turntable 12.

With the turntable 12 rotating, powder "P" is then deposited over the build platform 16. The applicator 42 is moved across the build platform 16 to spread the raised powder P horizontally over the build platform 16. Any excess powder P is pushed along the build platform 16 as the turntable 12 rotates to provide a continuous powder deposition and spreading.

As the powder is deposited and spread onto the rotating build platform 16, the directed energy source 46 is used to melt a two-dimensional cross-section or layer of the part being built. The directed energy source 46 emits a beam "B" and the beam steering apparatus 48 is used to steer the focal spot of the beam B over the exposed powder surface in an appropriate pattern. The exposed layer of the powder P is heated by the beam B to a temperature allowing it to melt, flow, and consolidate. This step may be referred to as fusing the powder P.

Once the first layer increment of powder P is fused, the build platform 16 is moved vertically downward by the layer increment, and another layer of powder P is applied in a similar thickness, see FIG. 7. In the case of additive manufacturing apparatus 10', the ring 31' is raised to allow another layer of powder P to be applied. The directed energy source 46 continues to emit a beam B and the beam steering apparatus 48 is used to steer the focal spot of the beam B over the exposed powder surface in an appropriate pattern. The exposed layer of the powder P is heated by the beam B to a temperature allowing it to melt, flow, and consolidate both within the top layer and with the lower, previously-solidified layer. It should be appreciated that the process of depositing powder P and using the directed energy source 46 to fuse the powder can be continuous as the part is being formed, with the process only being stopped when the part is completed or when a defect or malfunction is detected. It should also be appreciated that when multiple fusing units 20 are employed that each unit may be used to form a single increment layer or to form multiple increment layers.

This cycle of moving the build platform 16, applying powder P, and then directed energy melting the powder P is repeated until the entire part is complete. It is also noted that the vertical movement of build platform 16 or ring 31' may be continuous during the build process, so that the part builds continuously in a spiral configuration.

Once the part is complete, the vacuum pump 52 may be used to remove unused powder from the build chamber 14. The turntable 12 may then be lowered and the housing 18 and fusing unit 20 raised to disengage the inner and outer side walls 28 and 30 from the seal 38. The build platform 16 is then raised by actuator 34 to expose the part above the inner and outer sidewalls 28 and 30. In the case of additive manufacturing apparatus 10', the housing 18 and fusing unit 20 are raised and the ring 31' is lowered to expose the part above the inner and outer sidewalls 28' and 30'.

An alternative additive manufacturing apparatus is illustrated in FIGS. 8-11 and shown generally at reference numeral 100. The basic components are a turntable 112, a build chamber 114, a housing 118, a fusing unit 120 housed in the housing 118, and a powder unit 184. Each of these components will be described in more detail below.

The turntable 112 is a plate-like rigid structure configured to move vertically in the z-axis as well as rotate three hundred and sixty degrees. Unlike additive manufacturing apparatus 10, the turntable 112 acts as the build platform. As illustrated, the turntable 112 is secured to an end mount of a motor 122 that is operable to selectively rotate the turntable 112 and the motor 122 is secured to an end mount of an actuator 124 that is operable to selectively move the turntable 112 vertically up or down. The actuator 124 is secured to a support structure 126. The actuator 124 is depicted schematically in FIG. 8, as is the motor 122.

Figure 9:
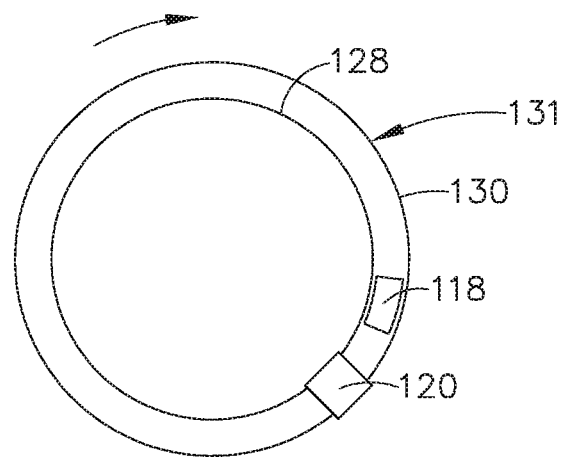
FIG. 9 is a top plan view of the apparatus of FIG. 8.
Figure 10:
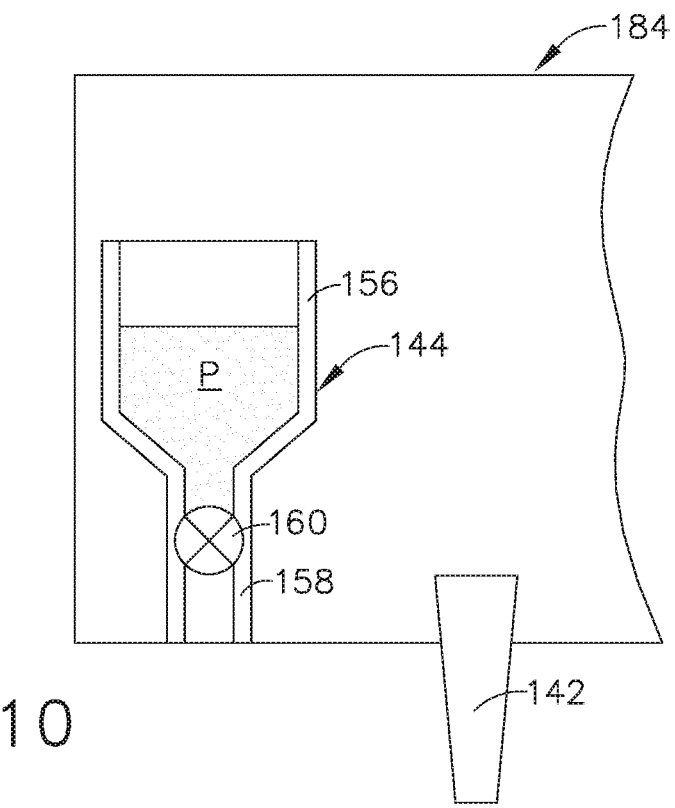
FIG. 10 is a schematic sectional view of a powder unit of FIG. 8.

The build chamber 114 includes inner and outer side walls 128 and 130 that define a build chamber opening 132. As illustrated, the inner and outer side walls 128 and 130 are parallel to each other and extend upwardly from the turntable 112 at a pre-determined angle to form a ring 131, see FIG. 9, to allow continuous manufacturing. One or both of the side walls 128 and 130 extend at a non-perpendicular angle to the turntable 112 and be referred to as "angled." One or both of the side walls 128 and 130 may be non-planar, and optionally they may be non-parallel to each other. The inner side wall 128 is releasably secured to the turntable 112 to allow the inner side wall 128 to be removed from the turntable 112. This arrangement allows a part 186 to be easily removed from the build chamber 114 when the build process has finished. As illustrated, the inner side wall 128 is secured to the turntable 112 by fasteners 188; however, it should be appreciated that other suitable connection types may be used. As depicted in FIG. 9, the inner and outer side walls 128 and 130 define a path in the form of ring 131; however, it should be appreciated that the inner and outer side walls 128 and 130 may define paths in other forms such as straight lines, curves, or polygons to permit the manufacture of various shaped parts.

The angled side walls 128 and 130 of the build chamber 114 permit the construction of parts 186 with a tapered cross-section while reducing the amount of powder P needed to produce the part 186.

The powder unit 184, another example of a build unit, is secured to an end mount of an actuator 190 that is operable to selectively move the powder unit 184 up and down. As illustrated, the powder unit is configured to move up and down within the build chamber 114 to deposit and scrape powder P deposited in the build chamber 114. As detailed in FIG. 10, the powder unit 184 includes an applicator 142 and a powder dispenser 144. The applicator 142 is a rigid, laterally-elongated structure that, when used, scrapes along the build platform to provide a layer increment of powder thereon between inner and outer side walls 128 and 130. The powder dispenser 144 comprises a supply container 156 in the form of a hopper having a spout 158 for dropping powder P onto the build platform. A metering valve 160 is positioned in the spout 158.

The housing 118 includes an opening 136 configured to receive at least a portion of the build chamber 114 therein and to permit the fusing unit 120 to build a part. A seal 138 is disposed around the opening 136 to provide sealing engagement between the opening 136 and the inner and outer side walls 128 and 130 of the build chamber 114. The seal 138 prevents contaminants from interfering with the build process, centers the housing 118 with the build chamber 114, and permits the housing 118 to slide along the inner and outer side walls 128 and 130 as the turntable 112 rotates with minimal interference. The housing 118 is secured to an end mount of an actuator 140 that is operable to selectively move the housing up or down during a build process to maintain a pre-determined distance between the fusing unit 120 and a part being built. The actuator 140 also allows the housing to be removed from engagement with the inner and outer side walls 128 and 130. The actuator 140 is depicted schematically in FIG. 8.

Figure 11:
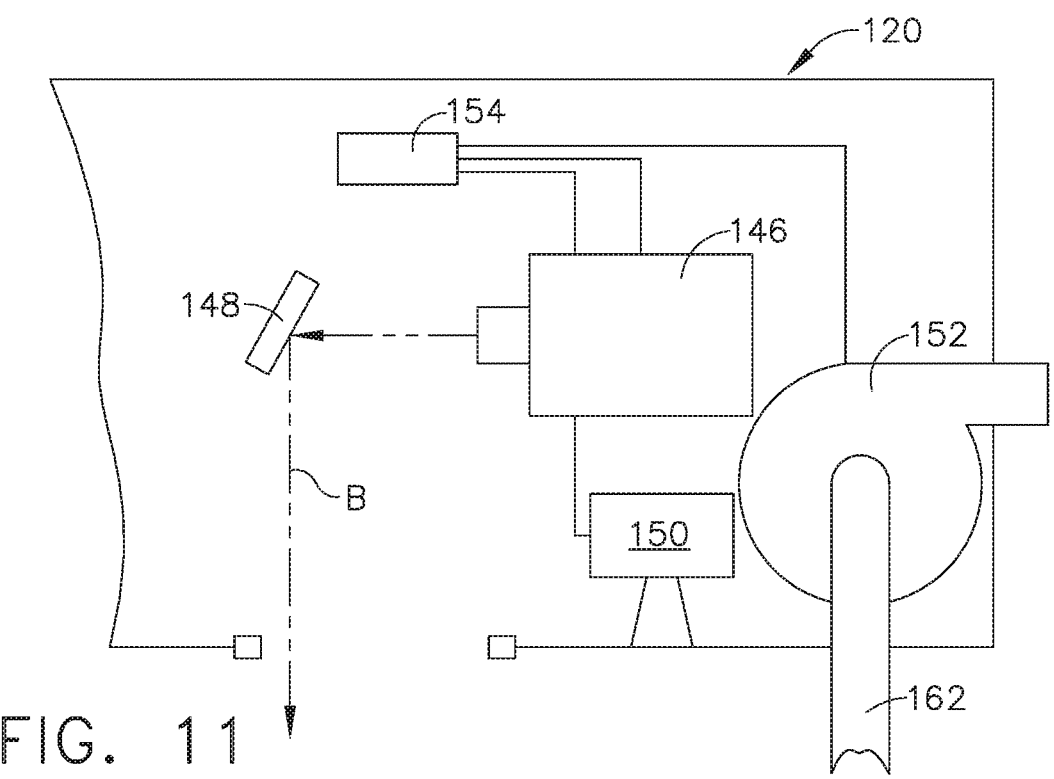
FIG. 11 is a schematic sectional view of a fusing unit of FIG. 8.

As illustrated in FIG. 11, the fusing unit 120, another example of a build unit, includes a directed energy source 146, a beam steering apparatus 148, an imaging device 150, a vacuum pump 152, and a controller 154.

The directed energy source 146 may comprise any known device operable to generate a beam of suitable power and other operating characteristics to melt and fuse the powder during the build process, described in more detail below. For example, the directed energy source 146 may be a laser. Other directed-energy sources such as electron beam guns are suitable alternatives to a laser.

The beam steering apparatus 148 comprises one or more mirrors, prisms, and/or lenses and provided with suitable actuators, and arranged so that a beam "B" from the directed energy source 146 can be focused to a desired spot size and steered to a desired position in an X-Y plane coincident with the build platform.

The vacuum pump 152 includes a nozzle 162 configured to extend into the build chamber 114. The vacuum pump 152 may be used to remove excess powder after the applicator 142 has leveled powder and before fusing takes place.

The imaging device 150 may be used for quality control as described above. The imaging device 150 The controller 154 controls the directed energy source 146, the beam steering apparatus 148, and the vacuum pump 152 of the fusing unit 120. The imaging device 150 may also be connected to the controller 154 to provide means for process control and/or automated quality control as described above.

The build process for a part 186 begins by filling the powder dispenser 144 with powder P. The fusing unit 120 is positioned such that seal 138 of housing 118 engages the inner and outer side walls 128 and 130. It should be appreciated that positioning the fusing unit 120 may be accomplished by using actuator 140 to lower the fusing unit 120 and/or by using actuator 124 to raise the turntable 112.

Once the fusing unit 120 is positioned, the powder unit 184 is lowered to an initial low position by actuator 190. The initial low position is located above the turntable 112 (build platform) by a selected layer increment. The layer increment affects the speed of the additive manufacturing process and the resolution of the part. As an example, the layer increment may be about 10 to 50 micrometers (0.0004 to 0.002 in.). The turntable 112 is then rotated by motor 122 at a pre-determined rotational speed selected to permit the fusing unit 120 to melt or fuse powder being dropped onto the build platform to form part 186. It should be appreciated that more than one housing 18 and fusing unit 20 may be used. As illustrated in FIG. 9, the fusing unit 120 and powder unit 184 are positioned along the ring 131 such that the powder unit 184 is in a first position and the fusing unit 120 is in a second position.

With the turntable 112 rotating, powder "P" is then deposited over the build platform. The applicator 142 is moved across the build platform to spread the raised powder P horizontally over the build platform. Any excess powder P is pushed along the build platform as the turntable 112 rotates to provide a continuous powder deposition and spreading.

As the powder is deposited and spread onto the rotating build platform, the directed energy source 146 is used to melt a two-dimensional cross-section or layer of the part being built. The directed energy source 146 emits a beam "B" and the beam steering apparatus 148 is used to steer the focal spot of the beam B over the exposed powder surface in an appropriate pattern. The exposed layer of the powder P is heated by the beam B to a temperature allowing it to melt, flow, and consolidate. This step may be referred to as fusing the powder P.

Once the first layer increment of powder P is fused, the powder unit 184 is moved upwardly by the layer increment, and another layer of powder P is applied in a similar thickness like that discussed in FIG. 7. The directed energy source 146 continues to emit a beam B and the beam steering apparatus 148 is used to steer the focal spot of the beam B over the exposed powder surface in an appropriate pattern. The exposed layer of the powder P is heated by the beam B to a temperature allowing it to melt, flow, and consolidate both within the top layer and with the lower, previously-solidified layer. It should be appreciated that the process of depositing powder P and using the directed energy source 146 to fuse the powder is continuous as the part is being formed. This process is only stopped when the part is completed or when a defect or malfunction is detected.

This cycle of moving the powder unit 184, applying powder P, and then directed energy melting the powder P is repeated until the entire part is complete. It is also noted that the vertical movement of the powder unit 184 may be continuous during the build process, so that the part builds continuously in a spiral configuration.

Once part is complete, the vacuum 152 removes any unused powder from the build chamber 114. The turntable 112 may then be lowered and the housing 118 and fusing unit 120 raised to disengage the inner and outer side walls 128 and 130 from the seal 138. The powder unit 184 is also raised out of the build chamber 114. The inner side wall 128 may then be removed to expose the part 186 for removal.

Figure 12:
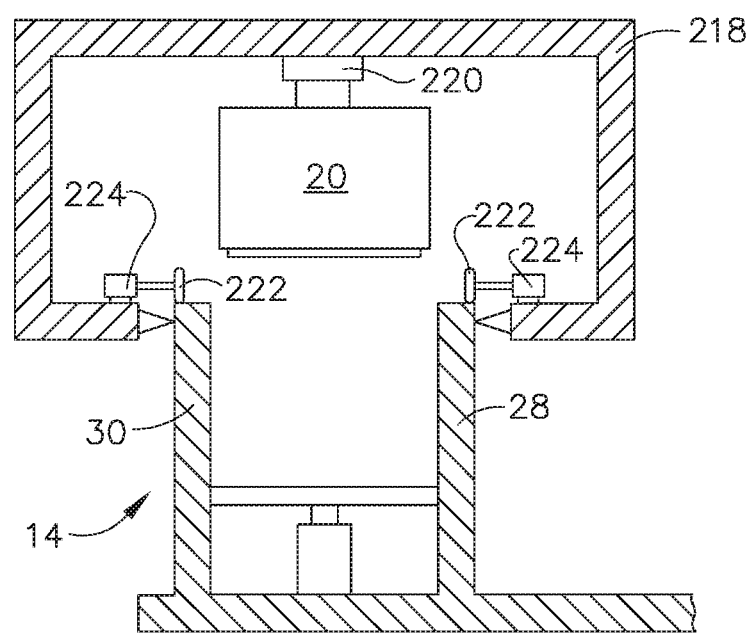
FIG. 12 is a cross-sectional view of a portion of an additive manufacturing apparatus incorporating a build unit having an alternative drive system.

The build units described above have been described as being supported by actuators which are used to position and move the build units relative to the respective build chambers. As an alternative, any of the build units described above may be provided with drive means for enabling movement relative to the build chamber without the use of an external actuator. For example, FIG. 12 illustrates the fusing unit 20 of FIG. 1, supported in a housing 218 which is similar to the housing 18 of in FIG. 1, using an actuator 220 that is operable to selectively move the fusing unit 20 up or down. The housing 218 is shown mounted over a portion of the build chamber 14 of FIG. 1. The housing 218 includes one or more rollers 222 that bear on the inner and outer side walls 28 and 30 of the build chamber 14. At least one of the rollers 222 is coupled to a motor 224. Operation of the motor 224 causes the roller 222 to drive the housing 218 along the perimeter of the build chamber 14 (e.g. into or out of the page as show in FIG. 12). Any mechanism which effects relative motion between the build unit and the build chamber may be substituted for the illustrated rollers 222 and 224, such as belts, gear racks, chains, linear actuators, etc.

The foregoing has described apparatus and methods for additive manufacture of large parts. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. An additive manufacturing method, comprising:
    positioning one or more build units over a build chamber defined by first and second spaced-apart side walls which extend along a pre-defined path;
    receiving at least a portion of the build chamber in an opening of a housing;
    disposing a seal around the opening, to provide sealing engagement between the opening and the first side wall and second side wall;
    moving each of the one or more build units relative to the build chamber along the pre-defined path;
    using each of the one or more build units to deposit powder onto a build platform contained in the build chamber and form a layer increment of powder thereon;
    using each of the one or more build units to direct a beam from a directed energy source to fuse the powder;
    moving at least one of the build platform, first and second spaced-apart walls, and each of the one or more build units by the layer increment; and
    repeating in a cycle the steps of depositing, directing, and moving to build up a part in a layer-by-layer fashion until the part is complete;
    wherein the pre-defined path is a ring; and
    wherein the first side wall and the second side wall are positioned on a turntable.

2. The method according to claim 1, wherein the steps of moving the build units, depositing powder, fusing the powder, and moving at least one of the build platform, first and second spaced-apart walls, and each of the one or more build units by the layer increment occur continuously.

3. The method according to claim 1, wherein each of the one or more build units include:
    a powder unit comprising a powder dispenser and an applicator; and
    a fusing unit comprising a directed energy source.

4. The method according to claim 3, further comprising:
    scraping the powder deposited from the powder dispenser using the applicator to form the layer increment of powder; and
    selectively fusing the layer increment of powder using the directed energy source.

5. The method of claim 4, further comprising:
    removing excess powder after an applicator has leveled the layer increment of powder before fusing the layer increment of powder.

6. The method according to claim 1, wherein one of the build units is a fusing unit comprising a powder dispenser, an applicator, and a directed energy source.

7. The method of claim 1, wherein the step of moving each of the one or more build units relative to the build chamber is carried out by rotating the turntable.

8. The method of claim 1, wherein the first and second spaced-apart side walls extend outwardly from the turntable.

9. The method of claim 1, wherein the turntable defines a moveable build platform.

10. The method of claim 1, wherein one or both of the side walls extend at a non-perpendicular angle to the turntable.

11. The method of claim 1, wherein the turntable includes an upper and lower platform.

12. The method of claim 11, wherein the upper platform is separated into multiple smaller platforms by slots, and wherein the first and second spaced-apart side walls are moveable up and down within those slots.

13. The method according to claim 1, further wherein the steps of depositing powder includes moving the powder dispenser and applicator into the build chamber between the first and second spaced-apart side walls.

14. The method according to claim 1, further comprising the step of evacuating the build chamber of loose powder when the part is complete.

15. The method of claim 1, further comprising:
monitoring a surface condition of the layer increment of powder using an imaging device.

16. The method of claim 1, wherein the build platform is disposed between the first and second spaced-apart walls.

17. The method of claim 1, further comprising:
controlling a deposition rate of the powder using a metering valve.

* * * * *